A. EKLUND.
BRACELET LINK.
APPLICATION FILED JUNE 3, 1915.
1,162,228.
Patented Nov. 30, 1915.
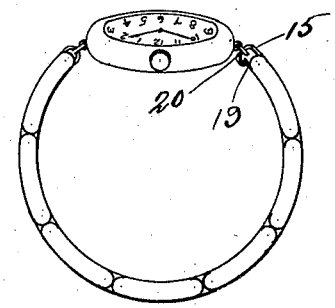
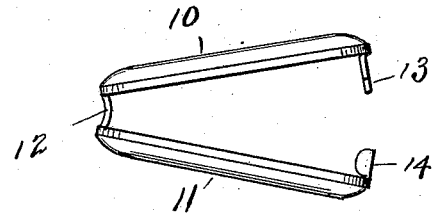
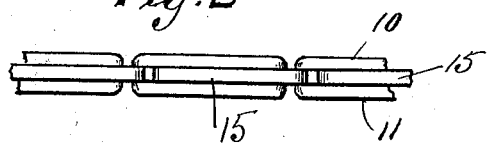
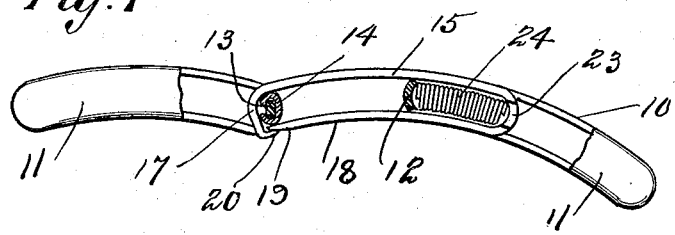
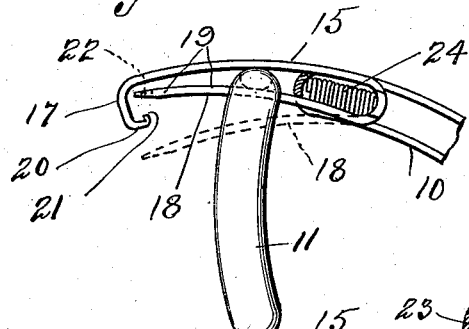
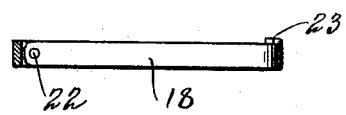
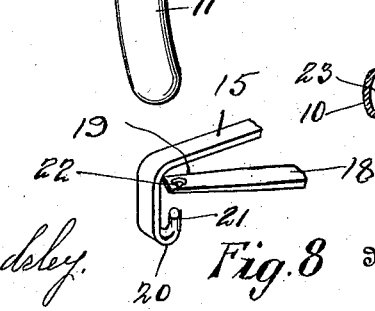
Witnesses
W. W. Bardsley.
Inventor
Alexander Eklund
By
Howard E. Barlow
Attorney
COLUMBIA PLANOGRAPH CO., WASHINGTON, D. C.

UNITED STATES PATENT OFFICE.

ALEXANDER EKLUND, OF ATTLEBORO, MASSACHUSETTS, ASSIGNOR TO STURDY-CUMMINGS COMPANY, OF ATTLEBORO FALLS, MASSACHUSETTS, A CORPORATION OF MASSACHUSETTS.

BRACELET-LINK.

1,162,228. Specification of Letters Patent. Patented Nov. 30, 1915.

Application filed June 3, 1915. Serial No. 31,974.

*To all whom it may concern:*

Be it known that I, ALEXANDER EKLUND, a citizen of the United States, and resident of the town of Attleboro, in the county of Bristol and State of Massachusetts, have invented certain new and useful Improvements in Bracelet-Links, of which the following is a specification.

This invention relates to extendible link bracelets, and has for its object to provide in such a bracelet inter-connecting guide links and slide links, the latter links being constructed in a hook form, whereby the different links of the bracelet may be readily connected together.

A further object of this invention is to bend the end of one slide link into the form of a short hook, the opposite side of this link being depressible with its end engaging that of the hook and normally extending beneath the adjacent connecting element of the next link which is engaged by the hook, whereby the hook is locked in closed position so long as the bracelet links lie end to end.

With these and other objects in view, the invention consists of certain novel features of construction, as will be more fully described, and particularly pointed out in the appended claims.

In the accompanying drawings: Figure 1— is a side view of the complete bracelet having links of my improved form attached to a watch. Fig. 2— is an edge view showing the general arrangement of the interconnecting links. Fig. 3— is a side elevation showing one of the guide links with its two side members at one end. Fig. 4— is an enlarged view showing the bracelet links in extended position with the hook portion of the slide link locked by engagement with the connecting element of the next adjacent link. Fig. 5— shows the position of the slide link and the next adjacent guide link to which it is connected as moved inward on the slide link to permit the unlocking and opening of the hook. Fig. 6— is a view showing the underside of the slide link with the hook portion in section, showing the opening in the depressible end into which the projection of the opposite end fits. Fig. 7— is an end view partly in section showing the offset at the bent end of this link as guided in the recess of one of the guide links. Fig. 8— is a perspective view showing the hook end of the guide link as turned inward to pass through a corresponding opening in the opposite portion thereof.

Referring to the drawings 10 and 11 designate the two side members of the guide link which are shown as being connected together at one end by the bridge 12 and at the opposite end by interlocking members 13 and 14 but any other suitable means may be employed for connecting the members of these guide links together. The slide link member 15 is preferably formed of a narrow bar of a width to slide in the space between the trough-shaped members and this bar is bent into an elongated loop form, one end 17 of the loop being bent over into the form of a short hook. The opposite side 18 of this slide link being adapted to be depressed and its end 19 is arranged to overlie the end 20 of the hook. This end 20 of this hook is turned inwardly at 21 to enter a corresponding opening 22 in the opposite overlying end 19. I have shown and described a projection 21 on the end of the hook and an opening in the opposite arm, but the projection and opening may be reversed and formed in the opposite members, if desired. By this construction of slide link the inherent spring of the stock of the depressible member 18 serves to cause this member to normally engage the end 20 and close the hook.

The essential feature of my present invention is the forming of the hook with an inwardly turned under lip so short that the depressible end of the slide link in lying over onto this end, is caused to extend beneath the bridge or connecting element 14 of the next adjacent link to which the hook is attached, whereby the hook is normally held closed by this bridge even when the links are in full extended position as shown in Fig. 4. This particular arrangement is found to be of great advantage in practice inasmuch as the links are normally somewhat extended and the springs 24 are under compression while on the arm of the wearer, and it is, therefore, of importance that the hook should be locked while the bracelet is extended. Then again the more the links are extended the less the slide links are supported and, therefore, if the ends are not securely locked at this time a slight twist or wrenching of the bracelet would tend to throw the hook out of engagement and permit the members to become detached and the bracelet lost.

By my improved construction, it will be seen that the bracelet cannot be unlocked except by sliding the bridge of the next guide link well back into the slide link as illustrated in Fig. 5, whereby the depressible portion may then be released and readily raised and sprung over to one side free of the end of the hook to spring down into the dotted position therein illustrated at which time the link may be readily detached to separate the members of the bracelet. The interlocking of the ends of this link have a number of advantages; first, by turning the end of the hook inward as illustrated in Fig. 8 the possibility of catching upon fine fabric or abrading the arm of the wearer is effectually prevented. Then again by causing the ends of the hook to engage each other the strength of this slide member is greatly increased as the hook is effectually prevented from being opened up by an unusual strain which may be brought to bear upon the bracelet which might otherwise straighten out the hook and pull the links apart. By forming the offset portion 23 at the bend of the slide link, an effective guide is provided to enter and slide in the recess of one of the trough-shaped members to keep both the members of this link in alinement.

The interlocking feature of the hook ends is claimed in this application only in combination with other structure, and not broadly as in my copending patent application Serial No. 18238 dated March 31, 1915. Neither is the offset guide member 23 claimed in this case, but is claimed in my above mentioned copending application.

I claim:

1. In a bracelet a pair of guide links, a slide link mounted to slide in one of said guide links, a hook on the slide link engageable with the adjacent end of the other guide link, said last named guide link being disposed to lock the hook to positively prevent accidental disengagement therefrom.

2. In a bracelet a pair of guide links each formed of two side members connected together by bridge elements, a slide link mounted to slide in each guide link, a hook on one of the slide links engageable with the bridge element at the end of the next guide link, said bridge element being disposed to positively prevent the engaging hook from being opened while the bracelet links are set end to end.

3. In a bracelet, a pair of guide links each having two side members connected by bridging elements, a slide link mounted to slide in each guide link, a hook formed on the slide links each engageable with the bridge element of the next guide link, said slide link having a depressible side whose end normally extends over the end of the hook and beneath the bridge element to which the hook is connected, whereby the hook is locked closed as long as the bracelet links lie end to end.

4. In a bracelet, a pair of guide links each having two side members joined by bridge elements, a slide link mounted to slide in each guide link, one side of each slide link having its end bent into a short hook form, the opposite side of the slide link being depressible with its end engaging that of the hook shaped side, said hook being engageable with the bridge of the next link, and said depressible end extending beneath said bridge element whereby the hook is normally locked closed.

5. In a bracelet, a pair of guide links each having two side members joined by bridge elements, a slide link mounted to slide in each guide link, one side of each slide link having its end bent into a short hook form, the opposite side of said slide link being depressible with its end engaging that of the hook, said hook being engageable with the adjacent bridge element of the next link, said depressible end extending beneath said latter bridge element whereby the hook is normally locked closed, one end of the hook member being provided with a projection adapted to fit into a corresponding perforation in the other end thereof.

6. In a bracelet, a pair of guide links and a connecting slide link, each guide link comprising two side members connected in spaced apart relation by bridge elements, the slide link being in elongated loop form and adapted to slide in the space between said members and having one end bent into a hook form to engage the adjacent bridge element of the next link, one end of the slide member overlying that of the hook end of said member and adapted to be depressed to open the hook, said overlying depressible end normally extending beneath said latter bridge element, whereby the hook is normally locked closed, and means in said hook ends for interlocking one with the other to strengthen said slide link.

In testimony whereof I affix my signature in presence of two witnesses.

ALEXANDER EKLUND.

Witnesses:
FRANK G. GRANT,
WALTER W. COBB.

Copies of this patent may be obtained for five cents each, by addressing the "Commissioner of Patents, Washington, D. C."